(12) United States Patent
Eulitz et al.

(10) Patent No.: US 10,556,504 B2
(45) Date of Patent: Feb. 11, 2020

(54) FILLING SYSTEM FOR OPERATING FLUID CONTAINERS

(71) Applicant: KAUTEX TEXTRON GMBH & CO. KG, Bonn (DE)

(72) Inventors: Dirk Eulitz, Bonn (DE); Hilmer Schichlein, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 65 days.

(21) Appl. No.: 15/301,231

(22) PCT Filed: Mar. 9, 2015

(86) PCT No.: PCT/EP2015/054796
§ 371 (c)(1),
(2) Date: Sep. 30, 2016

(87) PCT Pub. No.: WO2015/150022
PCT Pub. Date: Oct. 8, 2015

(65) Prior Publication Data
US 2017/0021724 A1 Jan. 26, 2017

(30) Foreign Application Priority Data
Mar. 31, 2014 (DE) .................. 10 2014 004 545

(51) Int. Cl.
*B60K 15/04* (2006.01)
*F16L 3/12* (2006.01)
*F01N 3/28* (2006.01)
*F01N 3/20* (2006.01)

(52) U.S. Cl.
CPC ............ *B60K 15/04* (2013.01); *F01N 3/2896* (2013.01); *F16L 3/1226* (2013.01);
(Continued)

(58) Field of Classification Search
CPC ................ B60K 15/04; B60K 15/01; B60K 2015/0464; B60K 2015/047;
(Continued)

(56) References Cited

U.S. PATENT DOCUMENTS

| 2,165,357 A | 7/1939 | Emmert |
| 3,369,695 A | 2/1968 | Johnson |

(Continued)

FOREIGN PATENT DOCUMENTS

| CN | 1911699 A | 2/2007 |
| DE | 895682 C | 11/1953 |

(Continued)

OTHER PUBLICATIONS

International Preliminary Report on Patentability dated Oct. 13, 2016, in related International Application No. PCT/EP2015/054796, filed Mar. 9, 2015.

(Continued)

*Primary Examiner* — Andrew T Kirsch
*Assistant Examiner* — Elizabeth J Volz
(74) *Attorney, Agent, or Firm* — Wiley Rein LLP

(57) ABSTRACT

The invention discloses a filling system for an operating fluid container (1) of a motor vehicle, comprising a filling hose (10) and at least one filling hose holding device (20). The filling hose holding device (20) can be fastened in an installation space of the motor vehicle, and the filling hose (10) can be fluid-connected to an operating fluid container (1) and to a filling neck (30). The filling hose (10) can be fastened in the installation space of the motor vehicle by means of the filling hose holding device (20) in such a manner that the filling hose (10) follows a contour defined by the filling hose holding device (20).

21 Claims, 4 Drawing Sheets

(52) U.S. Cl.
CPC ............... *B60K 2015/0464* (2013.01); *B60K 2015/0474* (2013.01); *F01N 3/2066* (2013.01); *F01N 2610/02* (2013.01)

(58) Field of Classification Search
CPC . B60K 2015/0474; F01N 3/00; F01N 3/2066; F01N 3/1226; F01N 2610/02; F16L 11/11
USPC ............. 220/86.2, 86.1, 562, 746; 137/351; 138/118, 121
See application file for complete search history.

(56) References Cited

U.S. PATENT DOCUMENTS

| | | | | |
|---|---|---|---|---|
| 4,274,549 | A * | 6/1981 | Germain | B60K 15/035 138/113 |
| 4,573,694 | A | 3/1986 | Goto et al. | |
| 5,343,738 | A | 9/1994 | Skaggs | |
| 7,422,242 | B2 | 9/2008 | Matsumoto et al. | |
| 7,594,583 | B2 * | 9/2009 | Whipple | B60K 15/04 220/86.2 |
| 7,628,178 | B2 * | 12/2009 | Ackermann | B60K 15/04 138/110 |
| 7,658,351 | B2 * | 2/2010 | Hansen | F16B 2/06 248/65 |
| 2007/0205193 | A1 | 9/2007 | Whipple | |

FOREIGN PATENT DOCUMENTS

| | | | | |
|---|---|---|---|---|
| DE | 6929388 | * | 1/1970 | ........... B60K 15/063 |
| DE | 3422345 | A1 | 12/1985 | |
| DE | 10326868 | | 1/2005 | |
| DE | 10338065 | A1 | 3/2005 | |
| DE | 102006056974 | | 10/2007 | |
| DE | 102011115144 | A1 | 3/2013 | |
| EP | 2574485 | | 4/2013 | |
| GB | 2088515 | A | 6/1982 | |
| JP | 2002-067713 | A | 3/2002 | |
| JP | 2003273486 | A | 9/2003 | |
| JP | 2007091056 | A | 4/2007 | |
| WO | 03/104013 | A1 | 12/2003 | |
| WO | 2015/150022 | A1 | 10/2015 | |

OTHER PUBLICATIONS

International Search Report and Written Opinion dated Aug. 7, 2015 in International Application No. PCT/EP2015/054796, filed Mar. 9, 2015.

Communication from German Patent and Trademark Office dated Sep. 20, 2018 in related German Patent Application 10 2014 004 545.5, filed Oct. 1, 2015.

* cited by examiner

FILLING SYSTEM FOR OPERATING FLUID CONTAINERS

RELATED APPLICATIONS

This application is a § 371 National Stage Application of PCT/EP2015/054796, filed Mar. 9, 2015, which claims priority benefit of Germany Application No. 10 2014 004 545.5, filed Mar. 31, 2014, and incorporated herein for all purposes.

FIELD

The present invention relates to a filling system for an operating fluid container of a motor vehicle. In addition, the present invention relates to an operating fluid container having a correspondingly embodied filling system. Furthermore, the present invention relates to a motor vehicle having a corresponding operating fluid container.

BACKGROUND

In the case of conventional operating fluid containers, for example in the case of fuel containers or in the case of SCR containers for holding an aqueous urea solution, the connection between the filling neck and the operating fluid container is usually ensured by means of a rigid pipe connection. The rigid pipe connection can be formed, for example, by means of a blow-molded part. In addition, it is also possible for the pipe connection to be implemented by means of a metal connection.

In the case of diesel motor vehicles and in the case of SCR operating fluid containers, the pipe connection which is implemented as a blow-molded part can be implemented in a single layer between the filling neck and the operating fluid container. In the case of an operating fluid container which is implemented as a fuel container for holding gasolines, in the case of a blow-molded part the pipeline comprises a barrier layer which is impermeable to hydrocarbons.

These pipeline systems which are known from the prior art and which are arranged between a filling neck and the operating fluid container and which connect them fluidically have in common the fact that they are embodied in a rigid fashion and are therefore essentially not flexible. In the case of an accident, these pipe systems can consequently not move away or not yield to a deformation of the vehicle. As a consequence, the pipe systems can be slightly squashed or cut up by vehicle body parts which penetrate the receptacle space. Furthermore, it is also possible that the pipe systems tear off in the region of the operating fluid container, in the region of the filling neck or at some other location. This results in operating fluid being able to escape after an accident. In the case of an operating fluid container which is embodied as a fuel container this gives rise to considerable fire risks.

From the prior art it is known to fabricate these pipe systems from steel pipes. In addition, it is known to reinforce the pipe systems by means of aramide fibers. These measures, however, have not brought about a situation in which in the case of accidents and deformations of the receptacle space in which the pipe system is accommodated within the vehicle the pipe system itself is not squashed/cut or torn off from the fuel container or the filling neck.

SUMMARY

The object on which the present invention is based is to make available a filling system which has an increased level of safety in the case of an accident. Furthermore, the present invention is based on the object of making available a filling system which can be used in a flexible way for different installation spaces within different motor vehicles. In addition, the present invention is based on the object of making available a filling system which is relatively low in weight, has relatively short cycle times for manufacture and has relatively low fabrication costs.

The objects on which the present invention is based are achieved by means of a filling system having the features of claim 1. Advantageous embodiments are described in the dependent claims thereof. In addition, the objects on which the present invention is based are also achieved by means of an operating fluid container having the features specified in claim 16. An advantageous refinement has the features of claim 17.

To be more precise, a filling system according to the invention for an operating fluid container of a motor vehicle comprises a filling hose and at least one filling hose holding device. In this context, the filling hose holding device can be fastened in an installation space of the motor vehicle. The filling hose can be respectively fluidically connected to the operating fluid container and to a filling neck. In this case, the filling hose can be fastened in the installation space of the motor vehicle by means of the filling hose holding device in such a way that the filling hose has a contour which is defined by the filling hose holding device.

The term hose denotes here a tubular connection to a fluid duct, wherein the hose can be deformed and can easily be adapted to a contour which is predefined, for example, by the filling hose holding device.

The operating fluid container can be, for example, a fuel container for diesel fuels or for gasolines. In addition, the operating fluid container can also be an SCR container which is designed to hold aqueous urea solution. Furthermore, the filling system is suitable for any operating fluid containers of a motor vehicle which are designed to hold operating fluids which can be replenished.

The installation space of the motor vehicle is an installation space between the operating fluid container and the filling neck. The filling hose can be bent by virtue of its flexibility. Therefore, in the case of an intrusion (for example in the case of an accident of the motor vehicle), the filling hose can move away from the intrusion into the receptacle space of the filling hose without tearing off from the operating fluid container or from the filling neck. Owing to the flexibility of the filling hose and to the associated ability of the filling hose to move away in the case of an intrusion into the receptacle space, the probability of squashing or of cutting of the filling hose by vehicle body parts penetrating the installation space is reduced. An operating fluid container which is equipped with the filling system according to the invention consequently has an increased level of safety, with the result that in the event of an accident the operating fluid is prevented from escaping, or is less likely to escape. Furthermore, a filling system according to the invention has, in comparison with blow-molded filling pipes, a reduction in weight of 30% to 50%. Compared to the filling systems which are fabricated from steel pipes, the filling system according to the invention has a reduction in weight of 100% to 200%.

Owing to the possibility of continuous extrusion of the filling hose, a significantly higher number of filling hoses can be manufactured per unit of time compared to blow-molded filling systems. Furthermore, the need for investment in a fabrication plant for the filling system according to the invention is considerably lower.

In addition, it is possible to fabricate the filling hose at a central location and to supply different filling hose holding devices so that different installation spaces are implemented in different motor vehicles with the same filling hoses but with different filling hose holding devices. This reduces the costs for supplying the filling system. Furthermore, it is possible to make available filling systems quickly, easily and cost-effectively for prototypes.

If the filling hose, follows the contour defined by the filling hose holding device, which can also be referred to as a contour device or contour shell, the filling hose then has at least in certain sections an outer shape which corresponds to this contour.

The filling hose holding device preferably comprises at least one undercut, wherein the undercut engages behind the filling hose which is fastened to the filling hose holding device.

The undercut can be embodied, for example, as a fastening tongue and/or as a fastening clip. In this context, the undercut is preferably of elastic design. The fastening tongue and/or the fastening clip can consequently be of elastic design.

Making available an undercut on the filling hose holding device provides the advantage that the filling hose can easily be clipped or pressed into the installation space which is defined by the filling hose holding device. When a predefined acceleration is exceeded, for example in the case of an accident, the filling hose can become detached from the filling hose holding device and can move away from intrusions into the installation space between the operating fluid container and the filling neck.

The filling hose holding device is preferably embodied as a contour shell. In this context, the receptacle space of the contour shell can be embodied, for example, with a U-shaped cross section and can have two walls which run parallel to one another and can assume any desired shape in the space. The contour shell can also be embodied in a shell shape which can then also assume any desired shape in the space. Of course, the contour shell can also have undercuts, with the result that the filling hose can be clipped into the contour shell.

The contour shell can also be embodied in such a way that it can hold the filling hose and the venting line and, if appropriate, also electric leads. For this purpose, the contour shell can be equipped with a plurality of different holding devices, wherein a first holding device is designed to hold the filling hose, a second holding device is designed to hold a venting line, and a third holding device can be designed to hold and guide an electric lead.

The contour which is defined by the filling hose holding device preferably has at least one bend, with the result that a filling hose which is fastened by means of the filling hose holding device follows the bend. As a result, the filling system can be adapted as desired to different installation spaces in the motor vehicle.

The filling hose holding device preferably has at least one predetermined break point. This provides the advantage that in the event of a predefined force effect being exceeded, for example in the event of an accident, the filling hose holding device yields or brakes at the predetermined break point, with the result that the filling hose can better move away from an intrusion into the installation space. The predetermined break point can be implemented by means of a perforation in the contour shell, by means of a reduction in the material thickness of the contour shell and/or by means of the geometry of the contour shell. The contour shell can also be implemented as a 2K component composed of two different plastics with different material properties.

In addition, it is possible for the filling hose holding device to be embodied in such a way that it has the predetermined break point described above but keeps the filling hose stable at predetermined fastening points in such a way that in the event of an accident the filling hose does not become detached from these fastening points. Consequently, the filling hose can break out of the filling hose holding device at points which are to be defined and/or the filling hose holding device yields at the predetermined break point or points but the filling hose is held stable at the fastening points in such a way that at these points the filling hose cannot break out of the filling hose holding device.

The filling hose holding device preferably comprises at least one fire barrier and/or one impact barrier. As a result, in the event of a fire the filling hose is protected against an excessive heating effect by the filling hose holding device. In addition, when an impact barrier is made available, the filling hose holding device can protect the filling hose in the event of an intrusion. In addition, by making available an impact barrier it is possible, for example in the case of a flat tire, to protect the filling hose against tire parts.

In the event of the filling hose holding device having predetermined break points and, furthermore, comprising a fire barrier and/or an impact barrier, there are the associated advantages that in the event of an intrusion into the installation space the filling hose can, on the one hand, move away from the intrusion and, on the other hand, the filling hose is moreover protected by the impact barrier or the fire barrier, for example, against a heating effect and against damage.

The filling hose holding device is preferably embodied as a wheel house shell with integrated holding device for the filling hose. As a result, the number of installation parts in the motor vehicle is reduced. The holding device which is attached to the wheel house shell is arranged here on the side facing away from the wheel of the motor vehicle. The wheel house shell serves here as an impact barrier. Alternatively, the wheel house shell can also be equipped with a further additional impact barrier and/or with a fire barrier. In addition, the wheel house shell can have one or more predetermined break points.

The filling hose is preferably embodied as a multi-layer filling hose with an integrated barrier layer composed, for example, of EVOH or PA, for hydrocarbons.

The filling hose also preferably has a recess which runs coaxially with respect to the filling hose and is of concave design in cross section.

This recess can serve, on the one hand, to fasten the filling hose to the filling hose holding device. In addition, the recess can also or alternatively serve to accommodate a venting line. Therefore, in this case the filling hose serves as a holding device for a venting line. Furthermore, the recess can serve to accommodate an electric lead, with the result that the filling hose then also serves as a holding device for the electric lead. In the event of an arrangement of a venting line and/or of an electric lead in the recess of the filling hose, the filling hose holding device does not necessarily have to have a holding device for the venting line or the electric lead.

The filling hose is preferably embodied at least in certain sections as a corrugated hose. This increases the flexibility of the filling hose, with the result that the filling hose can describe relatively small bending radii.

The filling hose preferably comprises at least in certain sections a reinforcement structure which runs in a helical shape on the outside of the filling hose. The helical reinforcement structure has the effect that the filling hose has increased rigidity in the region of the reinforcement structure and maintains the shape which has been given to it.

The filling hose is preferably embodied as a double hose with an outer line and an inner line which is arranged in the outer line. In this context, the outer line can be of corrugated or smooth design. In addition, the outer line can be embodied in a corrugated fashion in certain sections and a smooth fashion in certain sections. The same applies to the inner line. The inner line can be embodied in a corrugated or smooth fashion. The inner line can be embodied in a corrugated fashion in certain sections, and at the same time the inner line can be embodied in a smooth fashion in certain sections.

The inner line is preferably connected to the outer line at least in certain sections via material webs in such a way that the position of the inner line is secured in the outer line, at least in certain sections, by the material webs. In this context, the intermediate space between the inner line and the outer line also remains permeable to fluid in the region of the connection thereof. For example, in the end regions of the filling hose the inner line can be connected to the outer line by means of radially running material webs. The connection of the outer line to the operating fluid container and/or the filling neck is customarily made in a materially joined and/or positively locking fashion.

When the filling hose bends, the inner line is placed tangentially against the outer line in the region of the bending radii of the outer line with the result that bending of the inner line is avoided. Therefore, ventilation between the outer line and the inner line is not worsened. Furthermore, the inner line can be used without impedance to fill the operating fluid container.

A filling system which is embodied in a corresponding fashion provides the advantage that the filling hose assumes both the filling function of the operating fluid and the venting function of the operating fluid container. In this context, the venting does not have to take place in a counter-current mode with respect to the operating fluid, with the result that relatively large filling rates and venting rates are made possible compared to a filling pipe which is embodied with a single wall.

The outer line is preferably embodied at least in certain sections as a corrugated hose, and the inner line is embodied at least in certain sections as a smooth hose. It is also possible for the outer line to be embodied throughout as a corrugated hose and for the inner line to be embodied throughout as a smooth hose. Furthermore, it is, however, also possible for the outer line to be embodied as a smooth hose and also the inner line to be embodied as a smooth hose. In addition, it is possible for both the outer line and the inner line each to be embodied as corrugated hoses.

The outer line preferably comprises at least in certain sections a reinforcement structure which runs in a helical shape on the outside of the outer line. Owing to the helical reinforcement structure being made available, the filling hose has increased rigidity in this region.

The inner line and/or the outer line are/is preferably embodied as a multi-layer filling hose with an integrated barrier layer for hydrocarbons. As a result, the emissions in the event of an operating fluid container which is embodied as a fuel container for gasolines are reduced.

The object on which the invention is based is also achieved by means of an operating fluid container which comprises a filling system according to the invention. In this context, a first end of the filling hose is fluidically connected to the operating fluid container, and a second end of the filling hose is fluidically connected to the filling neck. The filling hose can be fastened in the installation space of the motor vehicle by means of the filling hose holding device in such a way that the filling hose follows a contour which is defined by the filling hose holding device.

In the event of the filling hose being embodied as a double hose, both the inner line and the outer line of the filling hose are each fluidically connected to the operating fluid container and to the filling neck. In this context, an operating fluid can be filled into the operating fluid container via the filling neck and the inner line. The intermediate space between the outer line and the inner line of the filling hose forms a venting line between the interior of the operating fluid container and the filling neck.

Further advantages, details and features of the invention can be found below in the explained exemplary embodiments. In this context, in particular:

DETAILED DESCRIPTION

In the description which now follows, identical reference symbols denote identical components or identical features, with the result that a description performed concerning a component with respect to a figure also applies to the other figures, so that a repetitive description is avoided.

Figure 1:
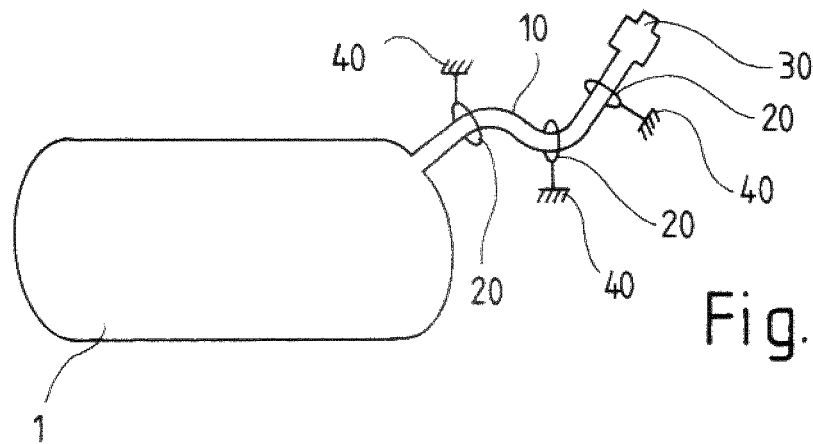
FIG. 1 shows a schematic illustration of an operating fluid container according to the invention.

FIG. 1 shows a schematic illustration of an operating fluid container 1 according to the invention together with a filling system according to the invention which is connected thereto. The operating fluid container 1 is fluidically connected to a filling neck 30 via a filling hose 10 of the filling system. The filling hose 10 is fastened in the installation space of the motor vehicle by means of a plurality of filling hose holding devices 20. In this context, the filling hose holding devices 20 are secured in the installation space of the motor vehicle at fastening points 40.

As is apparent from FIG. 1, owing to the filling hose 10 being secured in the installation space of the motor vehicle by means of the filling hose holding device 20, said filling hose 10 follows a contour which is defined by the filling hose holding device 20.

In a very simple embodiment, the filling hose holding device 20 can be embodied as a pipe clamp which is secured in the installation space of the motor vehicle and which holds the filling hose 10 in the installation space. In the schematic arrangement of the filling hose holding devices 20 from FIG. 1, an S-shaped contour is imposed on the filling hose 10, with the result that the filling hose 10 has two bends. Owing to the flexibility of the filling hose 10, it is bendable and could also follow other contours defined by the filling hose holding devices 20.

In the event of an intrusion (for example in the event of an accident of the motor vehicle) into the receptacle space of the filling hose 10, said filling hose 10 can move away from the intrusion, with the result that the filling hose 10 can be prevented from tearing off from the operating fluid container 1 and/or the filling neck 30 or this tearing off is at least counteracted. Owing to the flexibility of the filling hose 10 and of the associated possibility of the filling hose 10 moving away in the case of an intrusion into the receptacle space, the filling hose is not squashed, or is squashed to a lesser degree, by vehicle body parts.

Consequently, the filling system according to the invention and the operating fluid container 1 according to the invention provide the advantage that in the event of an accident the escape of operating fluid from the operating fluid container 1 is counteracted.

The operating fluid container 1 can be, for example, a fuel container 1 for diesel fuels or for gasolines. In addition, the operating fluid container 1 can also be configured as an SCR container 1 which is provided for holding an aqueous urea solution which can be injected into the exhaust train of a motor vehicle, in order to reduce the nitrogen oxide emissions.

Figure 2:
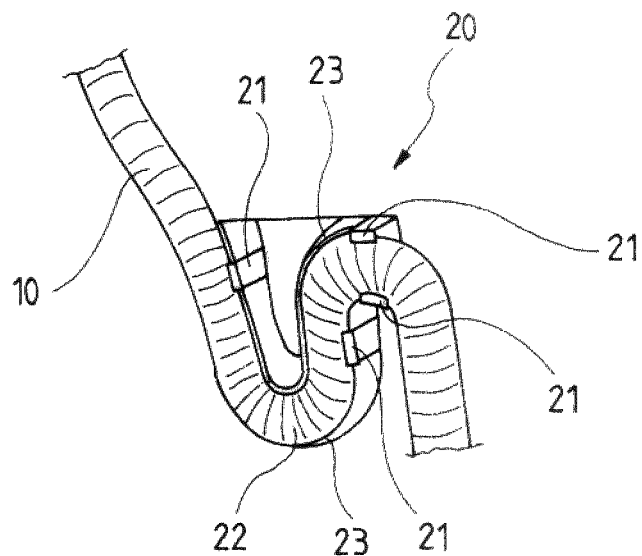
FIG. 2 shows a schematic illustration of a filling system according to the invention with a filling hose holding device embodied as a contour shell, and with a filling hose embodied as a corrugated hose.

In the case of the filling system which is illustrated in FIG. 2, the filling hose holding device 20 is embodied as a contour shell 20. The contour shell 20 comprises here two side walls 23 which run parallel to one another and between which the filling hose 10 can be positioned. Consequently, the contour shell 20 forms, when considered in cross section, a U-shaped receptacle space for the filling hose 10. In addition, the filling hose holding device 20 which is embodied as a contour shell 20 comprises a plurality of undercuts 21 which are embodied as fastening tongues 21 and which engage behind the filling hose 10 which is arranged between the side walls 23 of the contour shell 20. Consequently, the undercuts 21 hold the filling hose 10 reliably between the side walls of the contour shell 20, with the result that the filling hose 10 cannot be readily detached from the contour shell 20.

In the case of a predetermined force effect which can occur, for example, in the event of an accident being exceeded, the filling hose 10 can however become detached from the contour shell 20 in that the holding tongues 21 yield, owing to their flexibility and elasticity, and permit the filling hose 10 to become detached. In addition, the contour shell 20 can also have one or more predetermined break points which cause the filling hose holding device 20 to break in a defined fashion when a predetermined force effect is exceeded. As a result, the filling hose 10 can move away further in the case of an accident from an intrusion into the installation space, wherein parts of the contour shell 20 continue to be connected to the filling hose 10.

The filling hose holding device 20 can also serve as impact protection and/or heat protection by being embodied as an impact barrier and/or as a heat barrier or comprising the latter.

It is apparent from FIG. 2 that the filling hose 10 has two bends 22 of approximately 180° each, with the result that the filling hose 10 has an S-shaped contour.

Figure 3:
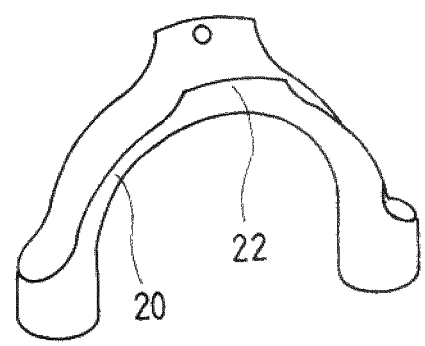
FIG. 3 shows a filling hose holding device of a filling system according to the invention illustrated alone.

FIG. 3 shows an illustration of a filling hose holding device 20, embodied as a contour shell 20, of a filling system according to the invention illustrated alone, i.e., without the filling hose 10. From FIG. 3 it is apparent that the contour which is formed by the contour shell 20 has a bend 22 of 180°. A filling hose 20 which is held by means of the contour shell 20 illustrated in FIG. 3 follows the contour defined by the contour shell 20 and consequently also has a bend of 180°. From FIG. 3 it is also apparent that the end pieces of the contour shell 20 are embodied in a closed fashion, with the result that a filling hose 10 cannot become detached from the contour shell 20. The center section of the contour shell 20 is configured in an open way, however, with the result that a filling hose 20 can be detached from the contour shell 20 in this region.

Figure 4:
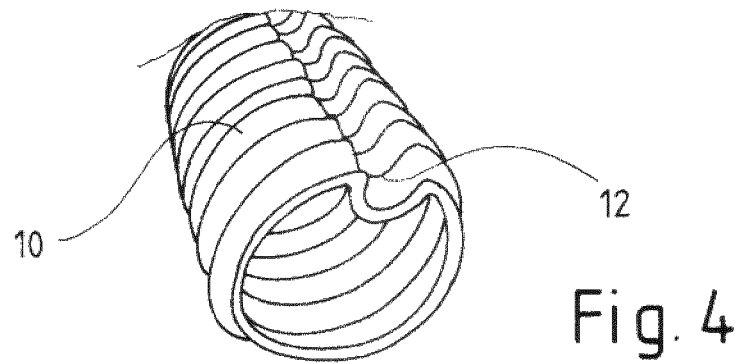
FIG. 4 shows a schematic perspective illustration of a filling hose embodied as a corrugated pipe, with a coaxial recess.

FIG. 4 shows a schematic spatial illustration of a filling hose 10 according to the invention which is embodied as a corrugated pipe 10 or as a corrugated hose 10. A corrugated hose 10 provides the advantage that it has a degree of flexibility which is increased even further, with the result that the corrugated hose 10 can follow even better a contour which is defined by the filling hose holding device 20. Consequently, relatively small bending radii are possible by virtue of the embodiment as a corrugated hose 10.

Figure 5:
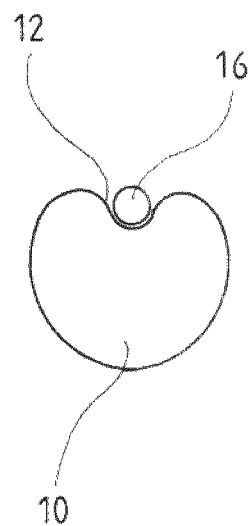
FIG. 5 shows a cross-sectional illustration of the filling hose illustrated in FIG. 4, with a venting line arranged in the recess.

From FIG. 4 it is apparent that the filling hose 10 which is embodied as a corrugated hose 10 has a recess 12 which runs coaxially with respect to the filling hose 10 and is of concave design in cross section. As illustrated in the schematic cross section in FIG. 5, for example a venting line 16 can be arranged in the recess 12. In addition, it is also possible for an electric lead to also be arranged in the coaxial recess 12.

The shaping of the coaxial recess 12 can be such that the coaxial recess 12 has itself undercuts, with the result that, for example, a venting line 16 can be clipped into the receptacle space defined by the recess 12. The undercuts of the recess 12 then engage behind the venting line 16 and can be removed from the recess 12 only with a force effect.

The arrangement of a venting line 16 or of an electric lead in the recess 12 provides the advantage that no separate holding device has to be made available for the venting line 16 or for an electric lead. Consequently, in this case the filling hose holding device 20 also serves as a holding device for a possible venting line 16 or for an electric lead.

Of course, it is also possible that a filling hose 10 which is embodied as a smooth pipe 10 has a recess 12 which runs coaxially with respect to the filling hose 10 and is of concave design in cross section.

Figure 6:
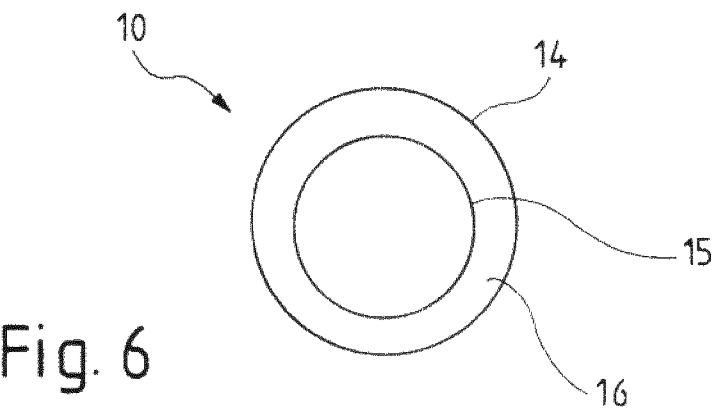
FIG. 6 shows a cross-sectional illustration of a filling hose comprising an outer line and an inner line.

FIG. 6 illustrates a schematic cross section through a filling hose 10 which is embodied as a double hose 10. The filling hose 10 comprises here an outer line 14 and an inner line 15 which is arranged in the outer line 14. The intermediate space between the outer line 14 and the inner line 15 serves as a venting line 16. When an operating fluid is filled into the operating fluid container 1 via the inner line 15, the venting out of the operating fluid container 1 occurs via the venting line 16. However, since the inflow line 15 is separate from the venting line 16, the venting does not take place in a counter-current mode with respect to the operating fluid, with the result that high filling rates are made possible.

Figure 7:
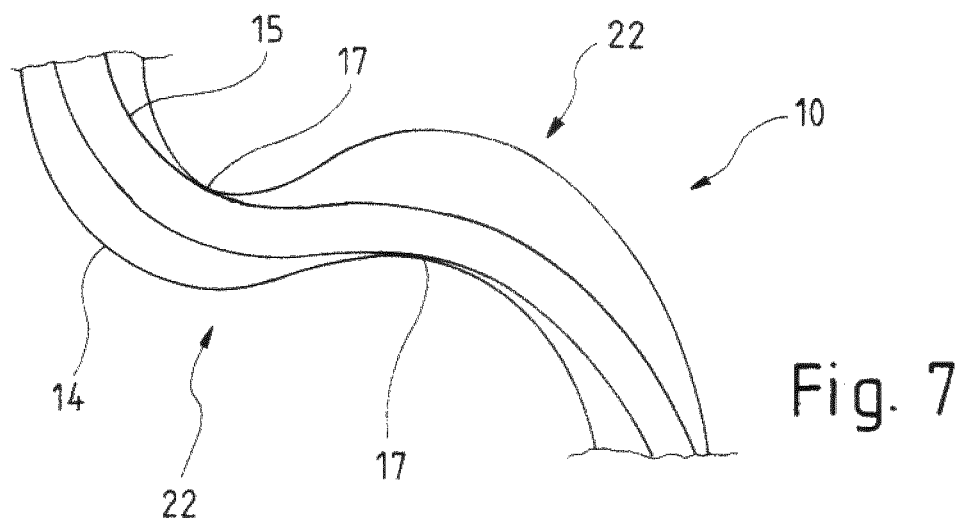
FIG. 7 shows a schematic illustration of a filling hose embodied as a double hose, with two bends.

FIG. 7 illustrates the profile of an inner line 15 in an outer line 15 which has two bends 22. During the bending of the filling hose 10, the inner line 15 bears tangentially against the outer line 14 at contact points 17, with the result that bending of the inner line 15 is avoided. Therefore, ventilation between the outer line 14 and the inner line 15 is not impeded by a bend in the filling hose 10. In addition, filling of the operating fluid via the inner line 15 is not impeded either since the inner line 15 does not have a kink as a result of it bearing tangentially against the outer line 14.

Both the inner line 15 and the outer line 14 can be embodied either as smooth hoses or as corrugated hoses. An inner line 15 which is embodied as a smooth hose provides the advantage that it brings about smaller turbulence of the operating fluid during the filling process, with the result that the filling rates can be increased. An outer line 14 which is embodied as a corrugated hose provides the advantage that it can have relatively small bending radii, since an outer line 14 which is embodied as a corrugated hose 14 has increased flexibility.

Figure 8:
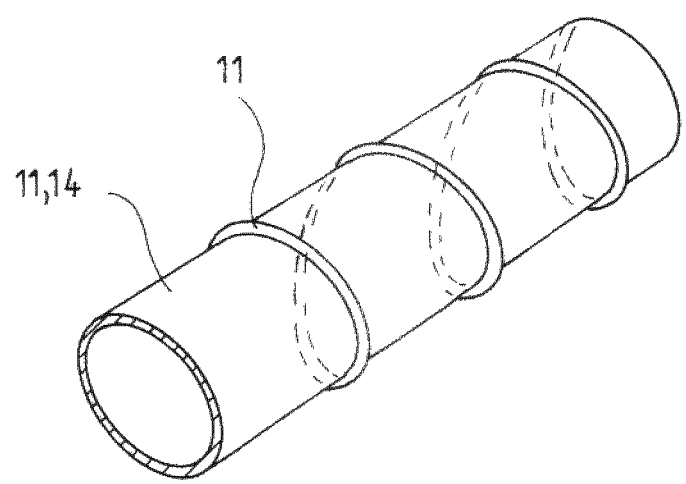
FIG. 8 shows a schematic illustration of a filling hose or of an outer line with a helical reinforcement structure.

FIG. 8 shows a filling hose 10 or an outer line 14 which comprises at least in certain sections a reinforcement structure 10 which runs in a helical shape on the outer side. The reinforcement structure 11 which is embodied in a helical shape is preferably connected in a materially joined fashion to the filling hose 10 or to the outer line 14.

As a result of the reinforcement structure 11 which is embodied in a helical shape, the filling hose 10 or the outer line 14 has increased rigidity in this region, with the result that correspondingly embodied regions can preferably be used in the case of straight connections between two filling hose holding devices 20.

Of course it is also possible for the filling hose 10 to comprise in certain sections the helical reinforcement structure 11 which is illustrated in FIG. 8, and for it to be embodied at other sections as a corrugated pipe or corrugated hose. At other sections, the filling hose 10 can be embodied as a smooth pipe or smooth hose.

The connection of the filling hose 10 to the operating fluid container 1 or to the filling neck 30 can be made, for example, by means of a welded or a bonded connection. In addition, these connections can also be embodied in a positively locking fashion. For this purpose it is possible for interface components (not illustrated in the figures) to be integrally injection molded onto the ends of the filling hose 10 at the end regions of the filling hose 10.

Depending on the design, the connections or clip arrangements between the filling hose 10 and the filling hose holding device 20 can be selected in such a way that the securing of the filling hose 10 prevents the movement of the filling hose 10 at specific locations and in contrast permits the movement of the filling hose at other locations.

In the event of the configuration of the filling hose holding device 20 as a contour shell 20, the latter is preferably manufactured using an injection molding method. As already mentioned above, the contour shells can also have further functions, specifically the function of protection against fire for the filling hose 10, the function of protection against the impact of stones, shearing wear or as a flat tire protection means, the function of securing venting hoses and/or filling hoses, cables, ropes and the like. In addition, a wheel house shell can have, on the side facing away from the wheel, a holding device for holding the filling hose 10, with the result that the wheel house shell is embodied as a filling hose holding device 20. The contour shell 20 can also perform an external supporting function of the filling hose 10 with the result that collapsing of the filling hose 10 is avoided. The filling hose holding device 20 can also be fastened to accommodating points of a reference point system.

LIST OF REFERENCE NUMBERS

1 Operating fluid container/fuel container/SCR container
10 Filling hose/corrugated pipe/corrugated hose
11 Reinforcement structure (of the filling hose)
12 Recess
14 Outer line
15 Inner line
16 Venting line
17 Contact point (between inner line and outer line)
20 Filling hose holding device/contour shell/pipe clamp
21 Undercut/fastening clip/fastening tongue
22 Bend (of the contour)
23 Side wall (of the filling hose holding device)
30 Filling neck
40 Fastening point (in the installation space of the motor vehicle)

The invention claimed is:

1. A filling system for an operating fluid container of a motor vehicle, comprising (a) a filling hose and (b) at least one filling hose holding device comprising a contoured portion, wherein
   (i) the filling hose holding device is configured to be fastened in an installation space of the motor vehicle;
   (ii) the entire filling hose is flexible and is configured to be fluidically connected to the operating fluid container and to a filling neck; and
   (iii) the filling hose is configured to be fastened in the installation space of the motor vehicle by engagement with the at least one filling hose holding device such that a portion of the filling hose, when engaged with filling hose holding device, assumes a S-shaped contour defined by the contoured portion of the filling hose holding device.

2. The filling system of claim 1, wherein the filling hose holding device comprises at least one undercut configured to engage the filling hose.

3. The filling system of claim 2, wherein the undercut is of elastic design.

4. The filling system of claim 1, wherein the filling hose holding device configured to define a contour shell.

5. The filling system of claim 1, wherein the filling hose holding device is configured to define a contour comprising at least one bend, and wherein the filling hose when engaged with the filling hose holding device assumes the bend of the filling hose holding device.

6. The filling system of claim 1, wherein the filling hose holding device comprises at least one predetermined break point.

7. The filling system of claim 1, wherein the filling hose holding device comprises at least one fire barrier and/or one impact barrier.

8. The filling system of claim 1, wherein the filling hose holding device is configured as a wheel house shell with integrated holding device for holding the filling hose.

9. The filling system of claim 1, wherein the filling hose is a multi-layer filling hose comprising an integrated barrier layer for hydrocarbons.

10. The filling system of claim 1, wherein the filling hose comprises a coaxial recess defining a concave cross section.

11. The filling system of claim 1, wherein the filling hose comprises at least one corrugated portion.

12. The filling system of claim 1, wherein the filling hose comprises at least one portion comprising a helically wound reinforcement structure disposed along the exterior the filling hose.

13. The filling system of claim 1, wherein the filling hose is a double hose comprising an inner hose disposed within an outer hose.

14. The filling system of claim 13, wherein the outer hose comprises corrugated hose, and the inner hose comprises smooth hose.

15. The filling system of claim 13, wherein the outer hose comprises a reinforcement structure disposed helically on the exterior of the outer hose.

16. The filling system of claim 13, wherein the inner hose is a multi-layer inner hose comprising an integrated barrier layer for hydrocarbons, and/or the outer hose is a multi-layer outer hose comprising an integrated barrier layer for hydrocarbons.

17. An operating fluid container comprising the filling system of claim 13, wherein the inner hose and the outer hose of the filling hose are each fluidically connected to the operating fluid container and to the filling neck; an operating fluid can be filled into the operating fluid container via the filling neck and the inner hose; and an intermediate space between the outer hose and the inner hose of the filling hose forms a venting line between the interior of the operating fluid container and the filling neck.

18. A motor vehicle comprising the operating fluid container of claim 17, wherein the filling hose holding device is fastened in an installation space of the motor vehicle; the filling hose is held in the installation space of the motor vehicle by the filling hose holding device; and a first end of the filling hose is fluidically connected to the operating fluid container and a second end of the filling hose is fluidically connected to the filling neck.

19. The filling system of claim 13, wherein the inner hose is connected to the outer hose at least in certain sections via material webs in such a way that the position of the inner hose is secured in the outer hose.

20. An operating fluid container comprising a filling neck and the filling system of claim 1, wherein a first end of the filling hose is fluidically connected to the operating fluid container and a second end of the filling hose is fluidically connected to the filling neck; and wherein the filling hose can be fastened in the installation space of the motor vehicle by engagement with at least one filling hose holding device such that the filling hose follows at least one contour defined by the at least one filling hose holding device.

21. A motor vehicle comprising the operating fluid container of claim 20, wherein the filling hose holding device is fastened in an installation space of the motor vehicle; the filling hose is held in the installation space of the motor vehicle by the filling hose holding device; and the first end of the filling hose is fluidically connected to the operating fluid container and the second end of the filling hose is fluidically connected to the filling neck.

* * * * *